United States Patent Office 2,729,632
Patented Jan. 3, 1956

2,729,632

MONO-AZO-DYESTUFFS INSOLUBLE IN WATER

Ernst Fischer and Franz Muris, Offenbach (Main), Germany, assignors to Farbwerke Hoechst A. G. vormals Meister Lucius und Brüning, Frankfurt am Main Hochst, Germany, a German company No Drawing. Application February 12, 1953,
Serial No. 336,638

Claims priority, application Germany February 15, 1952

7 Claims. (Cl. 260—193)

The present invention relates to new mono-azo-dyestuffs insoluble in water and to a process of preparing them; more particularly it relates to dyestuffs corresponding to the following general formula

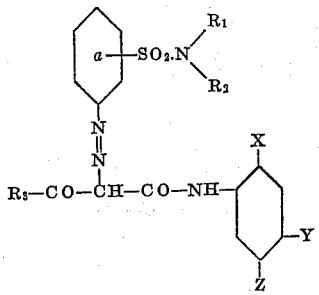

wherein the benzene radical $a$ contains at least one alkoxy, aralkoxy or aryloxy group, $R_1$ and $R_2$ represent alkyl radicals the sum of the carbon atoms of which is at least 5, which may be connected with each other to form a heterocyclic ring system, or aralkyl, aryl or hydroaromatic radicals, $R_3$ represents an alkyl or aryl group, X represents an alkyl or alkoxy group, Y represents an alkoxy group or a halogen atom, and Z represents an alkyl or alkoxy group or a halogen atom, with the exception, however, that Y stands for a halogen atom and Z for an alkyl or alkoxy group, or Y stands for an alkoxy group and Z for a halogen atom, if X represents an alkoxy group, and that Y stands for a halogen atom and Z for an alkoxy group, if X represents an alkyl group.

We have found that valuable pigment dyestuffs can be obtained by coupling a diazo-compound of an amine corresponding to the general formula

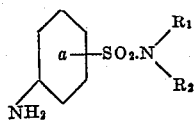

wherein the benzene radical $a$ contains at least one alkoxy, aralkoxy or aryloxy group, and $R_1$ and $R_2$ stand for alkyl radicals, the sum of the carbon atoms of which is at least 5, which may be connected with each other to form a heterocyclic ring system, or aralkyl, aryl or hydroaromatic radicals, with an acyl acetic acid aryl amide of the general formula

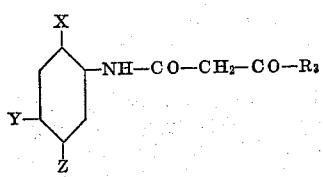

wherein $R_3$ represents an alkyl or aryl group, X represents an alkyl or alkoxy group, Y represents an alkoxy group or a halogen atom, and Z represents an alkyl or alkoxy group or a halogen atom, with the exception, however, that Y stands for a halogen atom and Z for an alkyl or alkoxy group, or Y stands for an alkoxy group and Z for a halogen atom, if X represents an alkoxy group, and that Y stands for a halogen atom and Z for an alkoxy group, if X represents an alkyl group.

The new dyestuffs yield yellow tints of good fastness properties. They are insoluble in water, but dissolve readily in many organic solvents, such as hydrocarbons, alcohols, esters or ketones. They can, therefore, be used for coloring these solvents and the lacquers prepared therewith, such as nitro or acetyl cellulose lacquers, films and plastic masses, and they can also be used for the production of spun-dyed acetate rayon by incorporating them in the spinning solutions. The new dyestuffs are also especially suitable for coloring oil varnishes, candles and fats.

As compared with the dyestuffs prepared from the same diazo-components and described in German Patents Nos. 703,415, 708,016 and 725,222, the dyestuffs of the present invention are distinguished by a better fastness to light.

The following examples serve to illustrate the invention, but they are not intended to limit it thereto, the parts being by weight:

Example 1

31.4 parts of 1-amino-2-methoxybenzene-5-sulfonic acid-di-n-butylamide are diazotized in the usual manner. In order to eliminate the excess of the mineral acid in the diazo-solution, sodium acetate is added thereto, and the diazo-solution is then poured, while stirring, into an aqueous suspension of 27.2 parts of 1-acetoacetylamino-2.5-dimethoxy-4-chlorobenzene, which has been prepared by dissolving this compound in dilute caustic soda solution and re-precipitating it with acetic acid. When the coupling is complete, the dyestuff formed is filtered off with suction, washed well and dried. It is a yellow powder, which dissolves readily in xylene, butyl acetate or other organic solvents, and colors cellulose ester lacquers vivid yellow tints of good fastness to light.

The dyestuff corresponds to the following formula

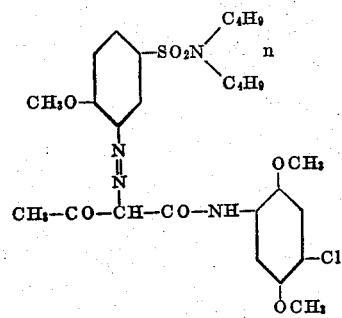

Example 2

34.4 parts of 1-amino-2.5-dimethoxybenzene-4-sulfonic acid-di-n-butylamide are diazotized in the usual manner. The diazo-solution is rendered neutral to Congo paper with a sodium acetate solution, and then stirred into a suspension of 27.2 parts of 1-acetoacetyl-amino-2.5-dimethoxy-4-chlorobenzene, which has been prepared by dissolving this compound in dilute caustic soda solution and re-precipitating it with acetic acid. The resulting dyestuff is filtered off with suction, washed well and dried. It is easily soluble in benzene, butyl acetate, acetone and other organic solvents and colors nitro cellulose lacquers, acetyl cellulose lacquers and oil varnishes vivid yellow tints which are somewhat more reddish than those obtained with the dyestuff described in Example 1, but have similar good fastness properties.

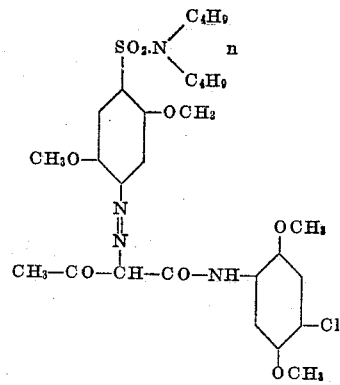

In the following table are given further components which can be used according to the present invention and the tints of the mono-azo-dyestuffs so obtained, which likewise possess good fastness properties:

| | Diazo Component | Coupling Component | Tint |
|---|---|---|---|
| (1) | 1-amino-2-methoxybenzene-5-sulfonic acid-di-iso-butylamide. | 1-acetoacetylamino-2.5-dimethoxy-4-chlorobenzene. | yellow. |
| (2) | N-methyl-iso-butylamide. | do | Do. |
| (3) | 1-amino-2-ethoxybenzene-5-sulfonic acid-di-n-butylamide. | do | Do. |
| (4) | di-n-propylamide. | do | Do. |
| (5) | 1-amino-4-ethoxybenzene-5-sulfonic acid-di-n-butylamide. | do | Do. |
| (6) | 1-amino-2-methoxybenzene-4-sulfonic acid-di-n-butylamide. | do | Do. |
| (7) | 1-amino-4-methoxybenzene-6-sulfonic acid-di-n-butylamide. | do | Do. |
| (8) | 1-amino-2-benzyloxybenzene-5-sulfonic acid-di-n-butylamide. | do | Do. |
| (9) | 1-amino-4-phenoxybenzene-5-sulfonic acid-di-n-butylamide. | do | Do. |
| (10) | 1-amino-2.4-dimethoxybenzene-5-sulfonic acid-di-n-butylamide. | do | reddish yellow. |
| (11) | 1-amino-2-methyl-4-methoxybenzene-5-sulfonic acid-di-n-butylamide. | do | yellow. |
| (12) | 1-amino-2-methoxy-4-chlorobenzene-5-sulfonic acid-di-n-butylamide. | do | Do. |
| (13) | 1-amino-2-methoxybenzene-5-sulfonic acid-di-n-butylamide. | 2.4-dimethoxy-5-chlorobenzene. | Do. |
| (14) | do | 1-acetoacetylamino-2.5-dimethoxy-4-bromobenzene. | Do. |
| (15) | do | 2.5-diethoxy-4-chlorobenzene. | Do. |
| (16) | 1-amino-2.5-diethoxybenzene-4-sulfonic acid-di-n-butylamide. | 2.5-dimethoxy-4-chlorobenzene. | reddish yellow. |
| (17) | 1-amino-2.5-dimethoxybenzene-4-sulfonic acid-di-n-propylamide. | do | Do. |
| (18) | N-methyl-benzylamide. | do | Do. |
| (19) | N-ethyl-cyclohexylamide. | do | Do. |
| (20) | N-methyl-phenylamide. | do | Do. |
| (21) | dibenzylamide. | do | Do. |
| (22) | piperidide. | do | Do. |
| (23) | N-benzyl-phenylamide. | do | Do. |
| (24) | 1-amino-2-methoxybenzene-5-sulfonic acid-N-benzyl-cyclohexylamide. | do | yellow. |
| (25) | N-cyclohexyl-phenylamide. | do | Do. |
| (26) | dicyclohexylamide. | do | Do. |
| (27) | diphenylamide. | do | Do. |
| (28) | 1-amino-2.5-dimethoxybenzene-4-sulfonic acid-di-n-butylamide. | 2-methoxy-4-bromo-5-methylbenzene. | reddish yellow. |
| (29) | do | 2-methoxy-4-chloro-5-methylbenzene. | Do. |
| (30) | do | 2-ethoxy-4-chloro-5-methylbenzene. | Do. |
| (31) | do | 2-methyl-4-chloro-5-methoxybenzene. | Do. |
| (32) | do | 1-benzoylacetyl-amino-2.5-diethoxy-4-chlorobenzene. | Do. |
| (33) | do | 2.5-dimethoxy-4-chlorobenzene. | Do. |
| (34) | do | 2.4-dimethoxy-5-chlorobenzene. | Do. |
| (35) | N-methyl-4'-methyl-phenylamide. | 1-acetoacetylamino-2.5-dimethoxy-4-chlorobenzene. | Do. |
| (36) | N-methyl-2'-chloro-phenylamide. | do | Do. |
| (37) | N-methyl-2'-methoxy-phenylamide. | do | Do. |
| (38) | 1-amino-2-methoxybenzene-5-sulfonic acid-di-n-butylamide. | 1-propionyl-acetyl-amino-2.5-dimethoxy-4-chlorobenzene. | yellow. |
| (39) | do | 1-butyryl-acetylamino-2.5-dimethoxy-4-chlorobenzene. | Do. |

We claim:
1. The water-insoluble mono-azo-dyestuffs corresponding to the following general formula

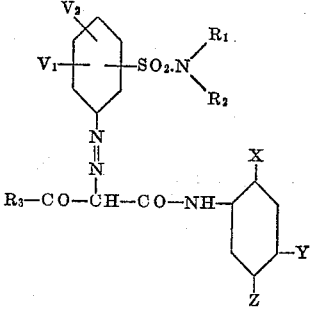

wherein $R_1$ and $R_2$ stand for members of the group consisting of lower alkyl benzyl, cyclohexyl and radicals of the benzene series, with the provision that if $R_1$ and $R_2$ are both alkyl radicals, the sum of their carbon atoms is 5 to 8, and these alkyl radicals may be connected in a piperidine ring, $R_3$ stands for a member of the group consisting of lower alkyl and phenyl, $V_1$ stands for a member of the group consisting of methoxy, ethoxy, phenoxy and benzyloxy, $V_2$ stands for a member of the group consisting of hydrogen, methyl, methoxy, ethoxy and halogen, X stands for a member of the group consisting of methyl, methoxy and ethoxy, Y stands for a member of the group consisting of methoxy, ethoxy and halogen and Z stands for a member of the group consisting of methyl, methoxy, ethoxy and halogen, at least one of the substituents X, Y and Z being a member of the group consisting of methoxy and ethoxy and one of the substituents Y and Z being halogen.

2. The water-insoluble mono-azo-dyestuffs corresponding to the following general formula

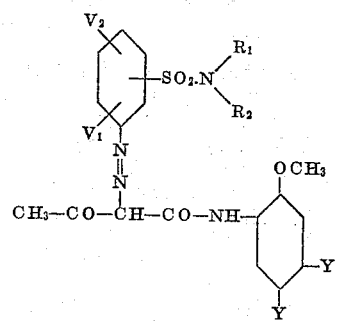

wherein $R_1$ and $R_2$ stand for members of the group consisting of lower alkyl, benzyl, cyclohexyl and radicals of the benzene series, with the provision that if $R_1$ and $R_2$ are both alkyl radicals, the sum of their carbon atoms is 5 to 8, and these alkyl radicals may be connected in a piperidine ring, $V_1$ stands for a member of the group consisting of methoxy, ethoxy, phenoxy and benzyloxy, $V_2$ stands for a member of the group consisting of hydrogen, methyl, methoxy, ethoxy and halogen, one Y stands for chlorine and the other Y for methoxy.

3. The water-insoluble mono-azo-dyestuff corresponding to the following formula

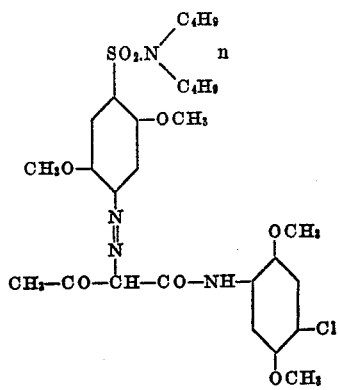

4. The water-insoluble mono-azo-dyestuff corresponding to the following formula

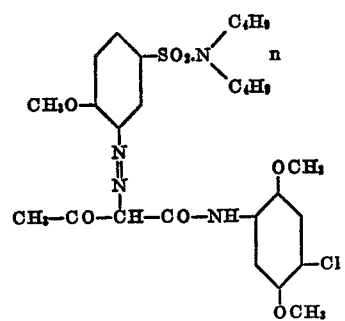

5. The water-insoluble mono-azo-dyestuff corresponding to the following formula

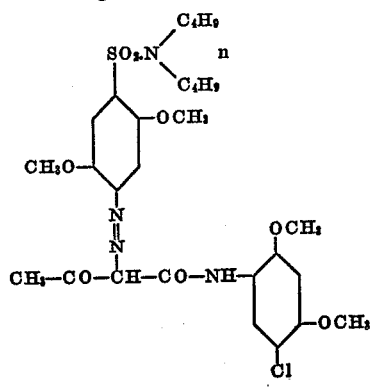

6. The water-insoluble mono-azo-dyestuff corresponding to the following formula

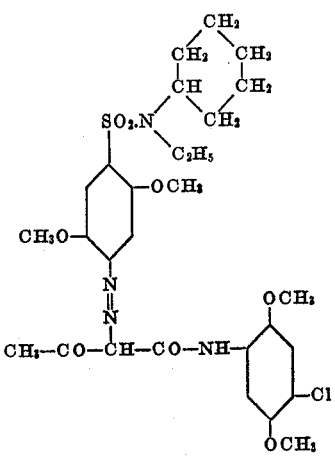

7. The water-insoluble mono-azo-dyestuff corresponding to the following formula

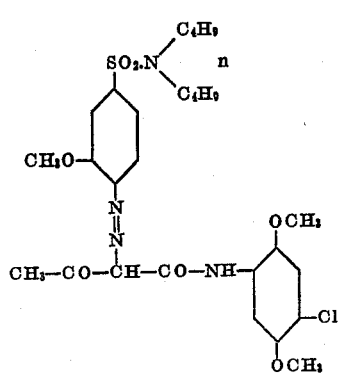

References Cited in the file of this patent

UNITED STATES PATENTS

| | | |
|---|---|---|
| 2,203,038 | Zitscher et al. | June 4, 1940 |
| 2,453,592 | von Glahn et al. | Nov. 16, 1948 |
| 2,644,814 | Fischer | July 7, 1953 |

FOREIGN PATENTS

| | | |
|---|---|---|
| 703,415 | Germany | Mar. 8, 1941 |